Nov. 28, 1972   J. T. INAMORATO   3,704,267
TERNARY FOAM CONTROL COMPOSITION AND BUILT ANIONIC
DETERGENT COMPOSITION CONTAINING SAME
Filed May 28, 1970   5 Sheets-Sheet 1

INVENTOR
JACK THOMAS INAMORATO

BY *Norman Blumenkopf*

ATTORNEYS

FULL DOOR LEVEL
2.4% DOCOSANOIC ACID
0.6% LAURIC ACID
2% NEODOL
2% OXAZOLINE 2.4% DOCOSANOIC ACID
0.6% 12 HYDROXY STEARIC ACID
2% NEODOL
2% OXAZOLINE

O.F*
* OVERFLOW
3% HYSTRENE 7022

3% HYSTRENE 7022
2% NEODOL
2% OXAZOLINE

United States Patent Office 3,704,267
Patented Nov. 28, 1972

3,704,267
TERNARY FOAM CONTROL COMPOSITION AND BUILT ANIONIC DETERGENT COMPOSITION CONTAINING SAME
Jack Thomas Inamorato, Westfield, N.J., assignor to Colgate-Palmolive Company, New York, N.Y.
Continuation-in-part of applications Ser. No. 41,359 and Ser. No. 41,601, both May 28, 1970. This application May 28, 1970, Ser. No. 41,308
Int. Cl. B01d 19/04; C11d 3/065
U.S. Cl. 252—524                                 25 Claims

ABSTRACT OF THE DISCLOSURE

A built anionic detergent composition having an inverse foam-to-temperature relationship is disclosed, as well as a ternary composition for accomplishing this relationship when added to the detergent system. The inverse foam-to-temperature relationship is provided by a synergistic mixture of a $C_8$–$C_{30}$ fatty acid, a particular group of oxazolines, and a $C_{12}$–$C_{20}$ polyethoxylated linear alcohol containing from about 10 to 50 moles of ethylene oxide.

---

Figure 1:
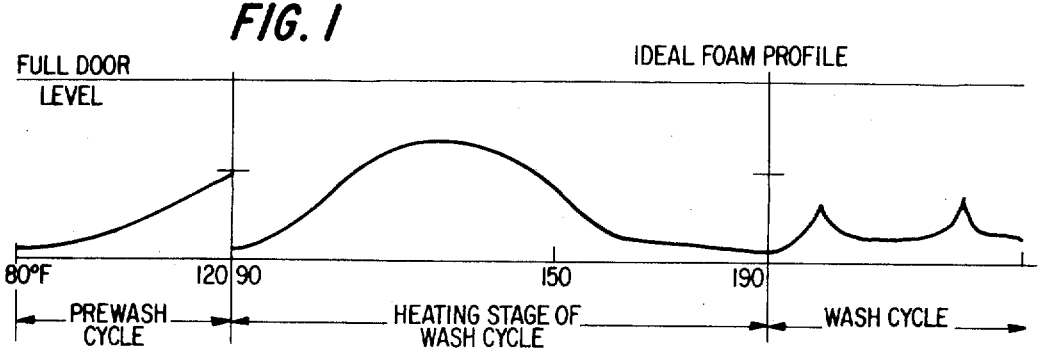

This application is a continuation-in-part of copending applications, Ser. No. 41,359 and Ser. No. 41,601, filed May 28, 1970.

This invention relates to detergent compositions. More particularly, this invention relates to detergent compositions which have an inverse foam-to-temperature relationship and to means for accomplishing this relationship.

The use of synthetic detergents for washing clothes has assumed worldwide importance due to the efficiency and cheapness of such products. These detergents are compounded with various additives to provide compositions having improved and desirable characteristics. Among these characteristics is that of maintaining a proper level of foam for suds.

Foaming, or sudsing, of detergents is an extremely important factor to consider when formulating a detergent composition. It is known, for example, that a detergent which over-foams does not do an efficient job of cleaning in a washing machine. On the other hand, in hand washing there is desire on the part of most consumers for a substantial amount of foam produced by a detergent. It is therefore necessary to provide a detergent composition which produces enough foam to reassure the consumer, but yet not so much foam as to inhibit the detergent action of the composition. This need has been satisfactorily achieved in many ways.

There is, however, another situation which requires a totally different approach to foam control in a detergent system. There are geographical areas where hot water is not readily available for one reason or another. In such areas, as well as others, washing machines are designed with internal water heating systems which begin their cycle with cold water and gradually heat the same to the desired operating temperature which is usually the "boil." Such washing machines are used extensively, for instance, in many European countries. It is well known, however, that a detergent system which provides an adequate level of foam when used with hot water will not foam at all in cold water. Conversely, a detergent system which is compounded so that a sufficient level of foam is produced in cold water will overflow to the extent of overflowing the washing machine when used with hot water. Of course, a detergent system which over-foams can have a foam suppressor included therein. The problem then, naturally, is that such a system will produce no foam when used with cold water. In other words, most detergent systems have essentially a direct relationship between temperature and foam, wherein as the temperature increases the amount of foam increases.

In the aforementioned co-pending application Ser. No. 41,359, there is described a synergistic mixture of a fatty acid and a polyethoxylated quaternary ammonium salt which provides control of the foam profile characteristic of a detergent system. A detergent system incorporating this synergistic mixture was found to give desirable foam characteristics at both low temperature and high temperatures. It was later found, however, that this binary foam control system has certain shortcoming which showed up at particularly high temperatures. When the temperature of the wash water exceeded about 200° F., overfoaming occurred. This problem was recognized and solved by the invention disclosed and claimed in the aforementioned co-pending application, Ser. No. 41,601. The problem of extremely high temperature over-foaming was solved in the invention claimed in the later application by the use of a ternary foam suppressing system, which consisted essentially of a synergistic mixture of a fatty acid, a polyethoxylated quaternary ammonium salt, and a member of a particular group of oxazolines having the general formula

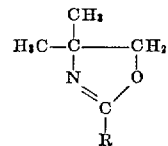

wherein R represents an alkyl group having from about 15 to about 21 carbon atoms.

While this ternary system gave greatly improved results over the binary system of the earlier application, it was found that when both the pre-wash and the wash cycles of a particular type of washing machine were used, there was a tendency to over-foam at the extremely high temperatures sometimes encountered at the end of the wash cycle.

Accordingly, it is a primary object of the present invention to provide a detergent system free of the aforementioned and other such disadvantages.

It is another object of the present invention to provide a detergent system having an inverse foam-to-temperature relationship.

It is still another object of the present invention to provide a detergent system which can be used in an environment wherein it will be subject to cold water as well as hot water and still provide a satisfactory foam level.

It is yet another object of the present invention to provide a composition which will impart an inverse foam-to-temperature relationship to a detergent system.

Other objects and advantages of the present invention will become apparent from the following detailed description thereof.

According to the present invention, a composition is provided for regulating the foam profile of a detergent system, comprising a ternary synergistic mixture of a fatty acid, a member of the group of oxazolines having the formula:

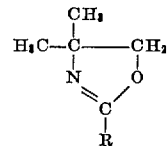

wherein R represents an alkyl group having from about 15 to about 21 carbon atoms, and a polyethoxylated linear alcohol. The detergent composition could have other additives such as brighteners, germicides, soil suspending agents, antioxidants, bleaches, coloring materials, and perfume. Since none of the members of the ternary system, when taken alone, provides the required inverse foam-to-temperature relationship, it was highly unexpected to find that the mixture exhibits these properties.

The useful fatty acids which may be employed in the present invention include those saturated linear acids containing between about 8 and 30 carbon atoms in their alkyl chain. These include: capric acid, lauric acid, myristic acid, palmitic acid, stearic acid, arachidic acid, behenic acid, ligoceric acid, cerotic acid, melissic acid, oleic acid, linoleic acid, as well as various natural and synthetic mixtures thereof.

The preferred fatty acids, however, are those having alkyl chains of from about 14 to 22 carbon atoms. One such preferred fatty acid is stearic acid. Another preferred acid composition is available commercially under the name "Hyfac 431." Hyfac 431 is a hydrogenated fish fatty acid having the following approximate composition:

8% myristic acid, 29% palmitic acid, 18% stearic acid, 26% arachidic acid, 17% behenic acid, 2% oleic acid.

Other commercially available mixtures of fatty acids are those which are available under the name "Hystrene." For instance, Hystrene 7022 comprises about 70% $C_{20}$ to $C_{22}$ fatty acids, Hystrene 9022 has at least 90% $C_{20}$ to $C_{22}$ acids, and Hystrene 9018 has about 90% stearic acid. Another such commercial product is "Neofat 18–58," which is a hydrogenated tallow acid. The fatty acid, used in combination with the polyethoxylated linear alcohol and the oxazline, should be present in the final detergent composition in an amount from about 1 to about 6 percent by weight of the total detergent composition.

The oxazolines to be used as part of the synergistic ternary foam suppressing system has the following general formula:

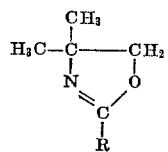

wherein R represents an alkyl group having from about 15 to about 21 carbon atoms.

The preferred such oxazoline is one in which R represents a linear alkyl group having 17 carbon atoms. This compound is 2-heptadecyl-4-dimethyl-2-oxazoline.

The polyethoxylated linear alcohol is a non-ionic surfactant having a linear alkyl chain length of from about 12 to about 20 carbon atoms. A preferred such non-ionic surfactant is commercially available under the name "Neodol 45–11," which is a polyethoxylated (11 moles) linear alcohol. Other suitable polyethoxylates having about 8 to 60 moles, preferably 10 to 50 moles, ethylene oxide may be used.

The useful detergents which may be used in conjunction with the foam profile regulating composition of the present invention include anionic detergents such as alkylbenzene-sulfonic acid and its salts, and compounds of the formula alkyl-phenyl-$SO_3$-M, wherein alkyl is an alkyl radical of a fatty acid and M is hydrogen or an alkali metal, which compounds comprise a well-known class of anionic detergents and include sodium dodecyl benzene sulfonate, potassium dodecylbenzenesulfonate, sodium laurylbenzenesulfonate, sodium cetylbenzenesulfonate. Others are the alkali metal dialkyl sulfosuccinates, e.g., sodium dioctylsulfosuccinate, sodium dihexylsulfosuccinate, sodium sulfoethylphthalate, sodium lauryl-p-anisidinesulfonate, sodium tetradecanesulfonate, sodium diisopropylnaphthalenesulfonate, sodium octylphenoxyethoxyethylsulfonate, etc.; and the alkali metal alkyl sulfates, e.g., sodium lauryl sulfate.

Among the above-noted alkylbenzene-sulfonic acid and salts thereof, the preferred compounds included those which are biodegradable and which are particularly characterized by a linear alkyl substituent of from $C_8$ to $C_{22}$ and preferably from $C_{10}$ to $C_{15}$. It is, of course, understood that the carbon chain length represents, in general, an average chain length since the method for producing such products usually employs alkylating reagents of mixed chain length. It is clear, however, that substantially pure olefins as well as alkylating compounds used in other techniques can and do give alkylated benzene sulfonates wherein the alkyl moiety is substantially (i.e., at least 99%) of one chain length, i.e., $C_{12}$, $C_{13}$, $C_{14}$, or $C_{15}$. The linear alkyl benzene sulfonates are further characterized by the position of the benzene ring in the linear alkyl chain, with any of the position isomers (i.e., alpha to omega) being operable and contemplated.

The linear alkyl benzene sulfonates are generally and conveniently prepared by sulfonating the corresponding alkyl benzene hydrocarbons which in turn may be prepared by alkylating benzene with a linear alkyl halide, a 1-alkene or a linear primary or secondary alcohol. Pure isomers (of the 1-phenyl isomer) are prepared by reduction of the acylated benzene (alkyl phenyl ketone) using a modification of the Wolff-Keshner reaction. The 2-phenyl isomer is obtained from n-undecyl phenyl ketone and methyl magnesium bromide to form the tertiary alcohol which is dehydrated to the alkene and then hydrogenated. The 5-phenyl isomer is obtained similarly from a n-heptyl phenyl ketone and n-butyl magnesium bromide. The other isomers are obtained in a similar manner from the appropriate n-alkyl phenyl ketone and n-alkyl magnesium bromide.

In addition to the benzene sulfonates, one may also employ the lower alkyl ($C_1$ to $C_4$) analogs of benzene such as toluene, xylene, the trimethyl benzenes, ethyl benzene, isopropyl benzene, and the like. The sulfonates are generally employed in the water soluble salt form, which includes as the cation the alkali metals, ammonium, and lower amine and alkanolamine.

Examples of suitable linear alkyl benzene sulfonates are:

sodium n-decyl benzene sulfonate
sodium n-dodecyl benzene sulfonate
sodium n-tetradecyl benzene sulfonate
sodium n-pentadecyl benzene sulfonate
sodium n-hexadecyl benzene sulfonate and the lower corresponding lower alkyl substituted homologues of benzene as well as the salts of the cations previously referred to. Mixtures of these sulfonates may, of course, also be used with mixtures which may include compounds wherein the linear alkyl chain is smaller or larger than indicated herein provided that the average chain length in the mixture conforms to the specific requirements of $C_{10}$ to $C_{22}$.

Other anionic detergents are the olefin sulfonates, including long chain alkene sulfonates, long chain hydroxyalkane sulfonates or mixtures of alkenesulfonates and hydroxyalkanesulfonates. These olefin sulfonate detergents may be prepared, in known manner, by the reaction of $SO_3$ with long chain olefins (of 8–25, preferably 12–21, carbon atoms) of the formula $RCH=CHR_1$, where R is alkyl and $R_1$ is alkyl or hydrogen, to produce a mixture of sultones and alkensulfonic acids, which mixture is then treated to convert the sultones to sulfonates.

The linear paraffin sulfonates are also a well-known group of compounds and include water soluble salts (alkali metal, amine, alkanolamine, and ammonium) of:

1-decane sulfonic acid
1-dodecane sulfonic acid
1-tridecane sulfonic acid
1-tetradecane sulfonic acid
1-pentadecane sulfonic acid
1-hexadecane sulfonic acid as well as the other position isomers of the sulfonic acid group.

In addition to the paraffin sulfonates illustrated above, others with the general range of $C_{10}$ to $C_{22}$ alkyls may be used, with the most preferable range being from $C_{12}$ to $C_{20}$.

The linear alkyl sulfates which are contemplated in this invention comprise the range of $C_{10}$ to $C_{20}$. Specific examples include sodium n-decyl sulfate, sodium n-dodecyl sulfate, sodium n-octadecyl sulfate, and the ethoxylated (1 to 100 moles ethylene oxide) derivatives, and, of course, the other water soluble salt-forming cations mentioned above.

The composition of the present invention may also include, in addition to the foam profile, regulating compounds and conventional anionic detergent compositions, builders, brighteners, hydrotropes, germicides, soil suspending agents, anti-redeposition agents, antioxidants, bleaches, coloring materials (dyes and pigments), perfumes, water soluble alcohols, non-detergent alkali metal benzene sulfonates, fabric softening compounds, enzymes, etc.

The builder is, generally, a water soluble, inorganic salt which may be a neutral salt; e.g., sodium sulfate or an alkaline builder salt such as phosphates, silicates, bicarbonates, carbonates, and borates. The preferred builders are those characterized as condensed phosphates such as polyphosphates and pyrophosphates. Specific examples of alkaline salts are: tetrasodium pyrophosphates, pentasodium tripolyphosphate (either Phase I or Phase II), sodium hexametaphosphate, and the corresponding potassium salts of these compounds, sodium and potassium silicates; e.g. sodium metasilicate and alkaline silicates ($Na_2O$; $2SiO_2$ and $Na_2O$; $3SiO_2$), sodium carbonate, potassium carbonate and sodium and potassium bicarbonate. Other salts may also be used where the compounds are water soluble. These include the general class of alkali metal, alkaline earth metal, amine, alkanolamine, and ammonium salts. Other builders which are salts of organic acids may also be used, and in particular the water soluble (alkali metal, ammonium, substituted ammonium and amine) salts of aminopolycarboxylic acids such as:

ethylene diamine tetra-acetic acid
nitrilo triacetic acid
diethylene triamine penta-acetic acid
N-(2-hydroxyethyl)ethylene diamine triacetic acid
2-hydroxyethyl-iminodiacetic acid
1,2-diaminocyclohexane diacetic acid, and the like.

In addition to the above ingredients, one may as previously delinated employ hydrotropes in connection with the compositions of the instant invention. The useful hydrotropes include such compounds as sodium xylene sulfonate, potassium xylene sulfonate, sodium and potassium toluene sulfonates, in the position isomers thereof, and ethyl benzene sulfonate.

It has now been found, quite unexpectedly, that when the synergistic mixture of a fatty acid, a polyethoxylated linear alcohol, and an oxazoline as disclosed above is added to a conventional detergent system, or is used in combination with the above detergents and other conventional detergent additives, an inverse foam-to-temperature relationship is exhibited by the resulting system.

In the composition for regulating the foam profile of a detergent according to the present invention, there is employed from about 20 to 80 percent fatty acid, from about 10 to 60 percent polyethoxylated linear alcohol, and from about 10 to about 60 percent oxazoline. Preferably, there is employed from about 35 to 60 percent fatty acid, from about 20 to 40 percent polyethoxylated linear alcohol, and from about 20 to about 40 percent oxazoline. In terms of the total detergent system, there is employed from about 1 to 6 percent fatty acid, from about 1 to 6 percent polyethoxylated linear alcohol, and from about 1 to about 6 percent oxazoline, and preferably from about 2 to 5 percent fatty acid, from about 1 to 3 percent polyethoxylated linear alcohol, and from about 1 to about 3 percent oxazoline. All of said percentages are by weight, based on the total amount of the composition being used. In the case of the detergent systems, the percentages are based on an anionic detergent concentration of about 8 to 18 percent by weight. When less anionic detergent is present in the system, a correspondingly lesser amount of each of the fatty acid, the polyethoxylated linear alcohol, and the oxazoline can be used. Builders when used may range from 10–85 wt. percent.

The present invention will now be illustrated by the following, more detailed examples thereof. It is noted, however, that the present invention is not deemed as being limited thereto.

The following examples demonstrate the foam profiles of various detergent systems under the conditions of use to be encountered in Europe. The detergent compositions were tested in a Miele automatic washing machine, which is of German manufacture. The machine is a front-loading, tumbler-type washing machine equijpped with a heater that raises the water temperature from room temperature to the boil. The machine operates on 220 volts, 50-cycle alternating current. In each instance, the machine was set on the white clothes setting, and a five-pound load of clean clothing was used. The water capacity is 11 liters. A detergent concentration of 0.5% was used in each cycle. This detergent concentration was provided by using 56 grams of detergent.

The machine operates on two cycles, a pre-wash cycle and a wash cycle. In the pre-wash cycle, the temperature of the water climbs from 70 to 120° F., and the total cycle is 12 to 14 minutes. The drum rotates for about 10 seconds, rests for 4 seconds, reverses direction, and the operation is repeated. At the end of the cycle, the machine stops, drains, and remains "motionless" unless the wash cycle starts.

The wash cycle is divided into the two stages, the heating stage and the washing stage. In the heating stage, cold water washes a second charge of detergent into the drum. During this 30-minute stage, the temperature climbs from about 90° F. to over 190° F. The drum rotates for 4 to 5 seconds, rests for 10 seconds, reverses direction, and repeats the operation. At the end of the heating period, the machine changes its drum action and goes into the washing stage.

The washing stage lasts 18 minutes. During this time, the drum action is the same as that described for the pre-wash cycle. The temperature fluctuates between 190° and 200° F. during the whole washing stage.

EXAMPLE 1

A basic formula was used in the following test having the following composition:

Ingredients: Percent
  Water _____ 8.5
  Linear alkylbenzene sulfonate (tridecyl)[1]___ 10.0
  Sodium tripolyphosphate _____ 35.0
  Sodium perborate tetrahydrate _____ 30.0
  Sodium silicate _____ 7.0
  Foam suppressing system, sodium sulfate, CMC, brighteners q.s.

[1] Sodium salt.

This basic detergent system was tested according to the foregoing procedure in the Miele washing machine. The foam profile was determined as a function of the temperature of the wash water and of the foam height as observed through the washing machine door.

The ideal foam profile is shown in FIG. 1, wherein as the temperature rises from 70 to about 120° F. in the pre-wash cycle the amount of foam increases to about half-way up the washing machine door. In the heating stage of the wash cycle, the amount of foam reaches approximately half-way at a temperature of between about 120 and 150° F. and then drops so that by the time the water has reached the operating temperature the amount of foam has decreased. During the wash cycle, the amount of foam remains relatively constant with minor fluctuation.

Figure 2:
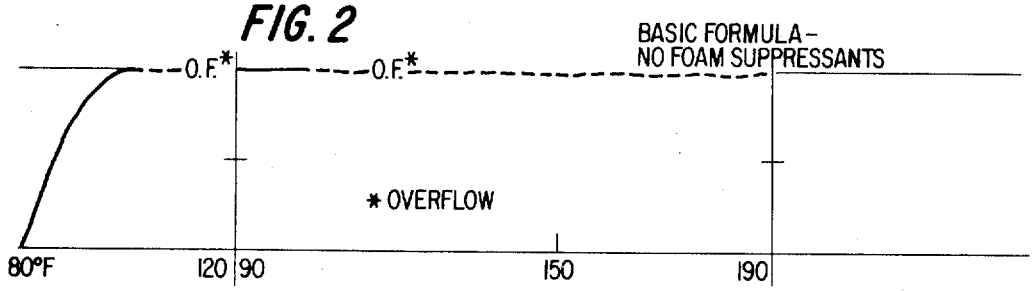

As can be seen from FIG. 2, the basic detergent system containing no foam suppressors produces a rapid rise in the amount of foam to the point of overflowing the machine. This condition is unsatisfactory.

EXAMPLE 2

Figure 3:
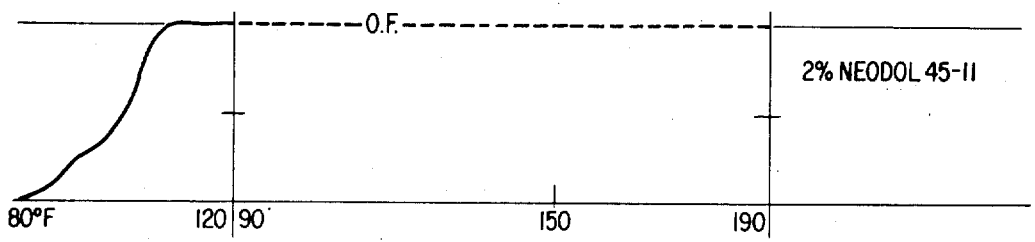
Figure 4:
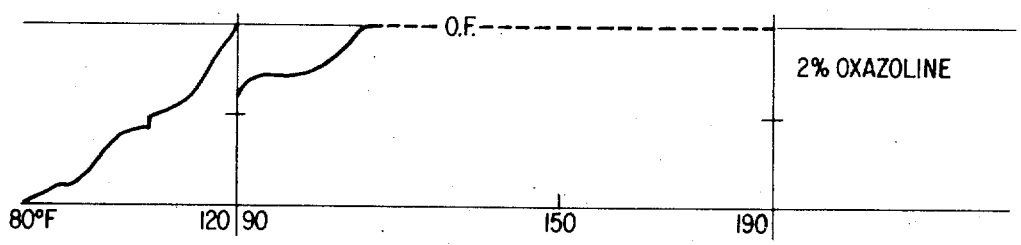
Figure 5:
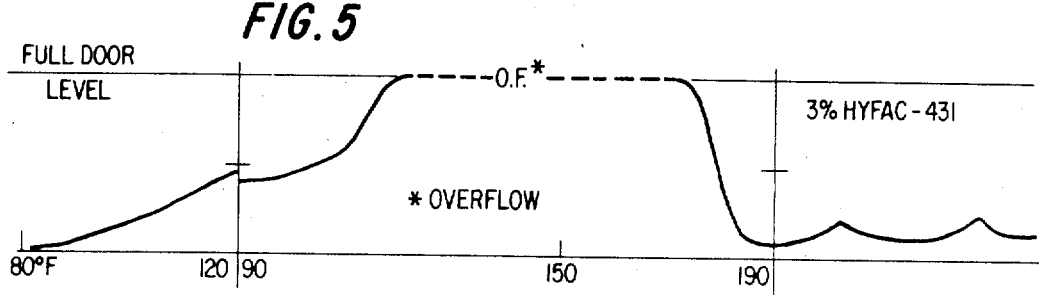
Figure 6:
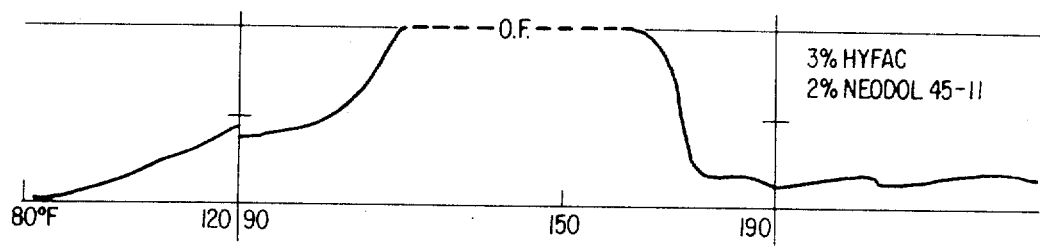
Figure 7:
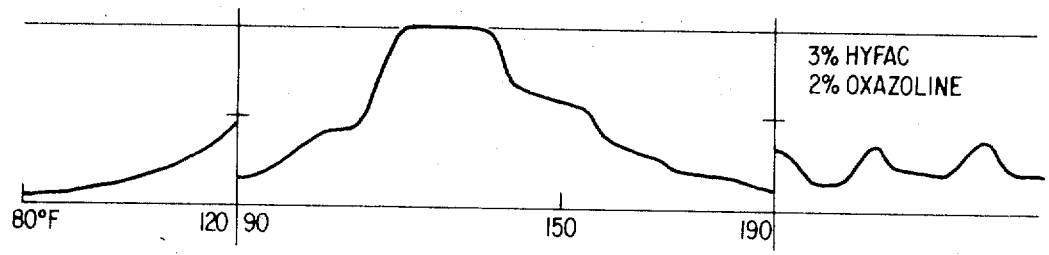
Figure 8:
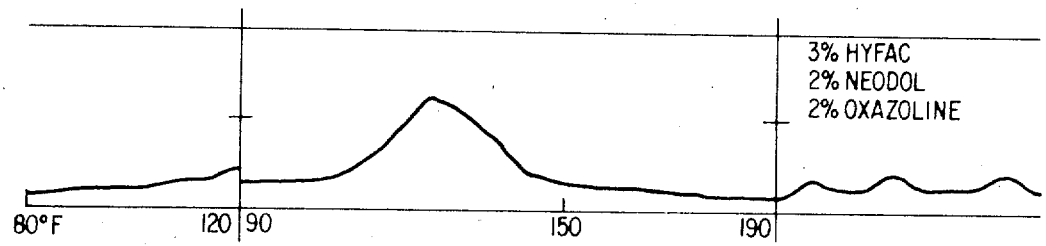
Figure 9:
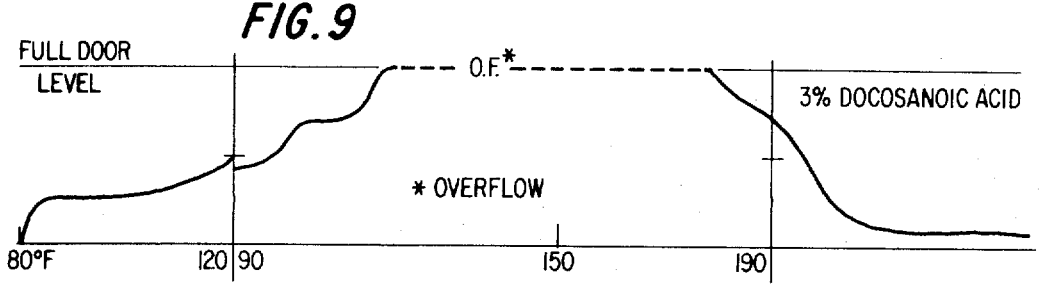
Figure 10:
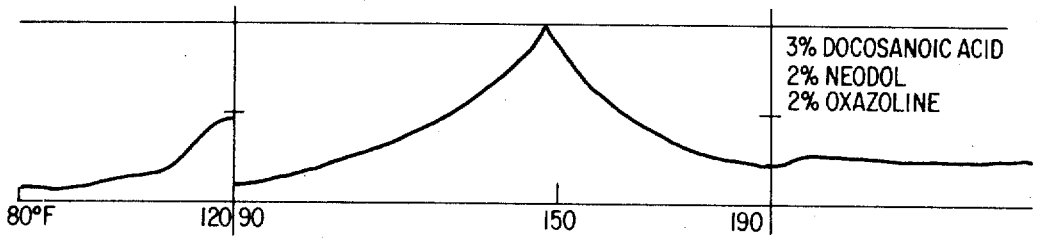
Figure 11:
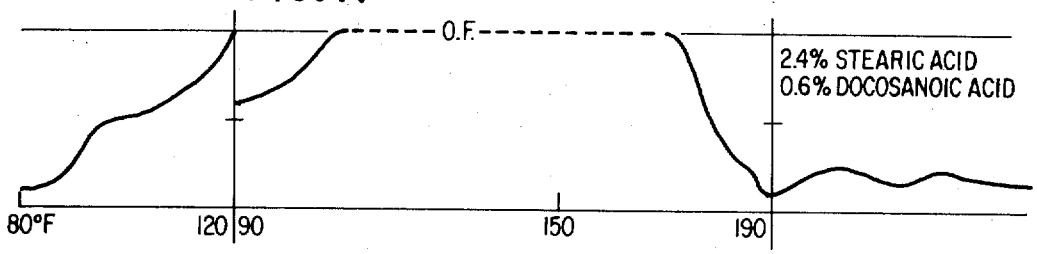
Figure 12:
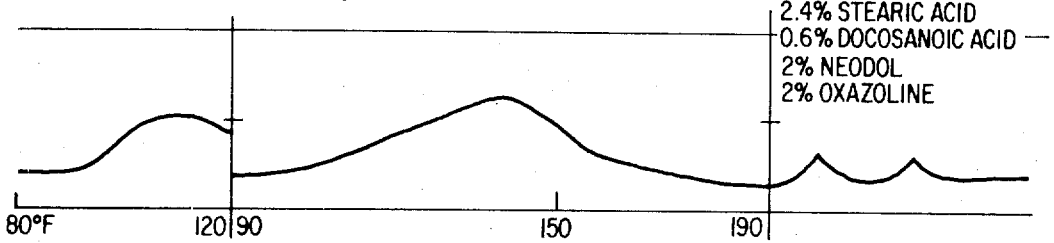
Figure 13:
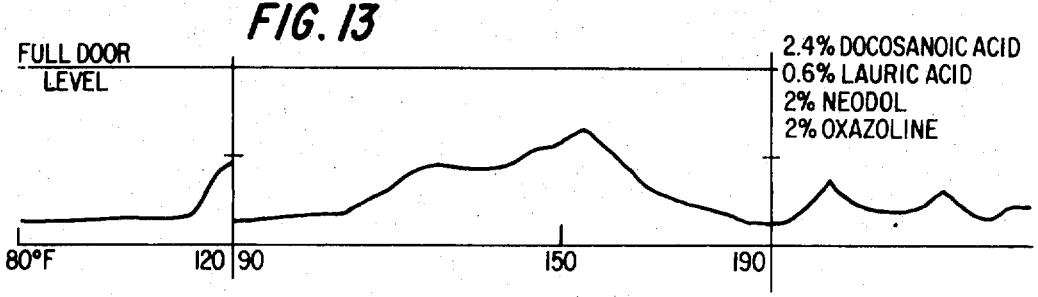
Figure 14:
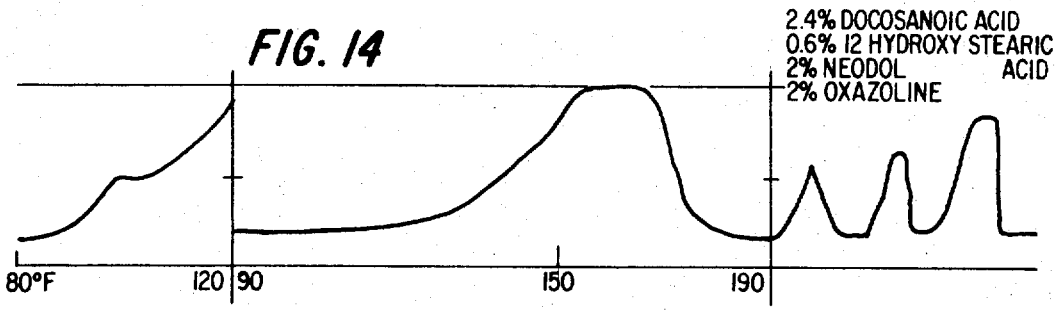
Figure 15:
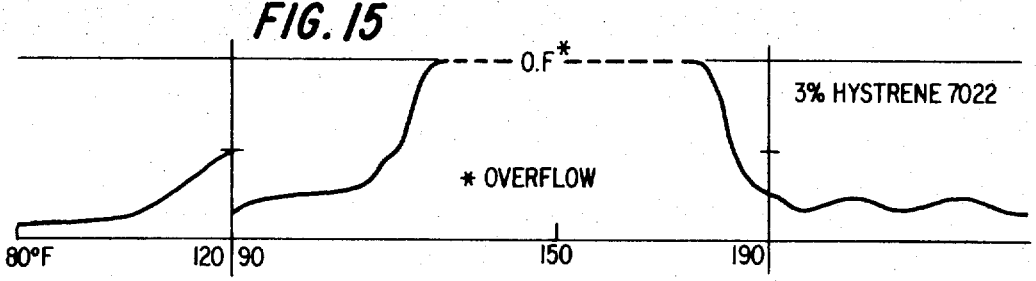
Figure 16:
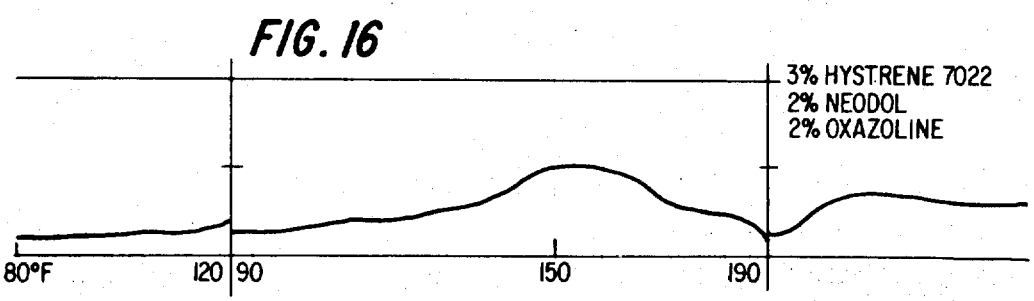
Figure 17:
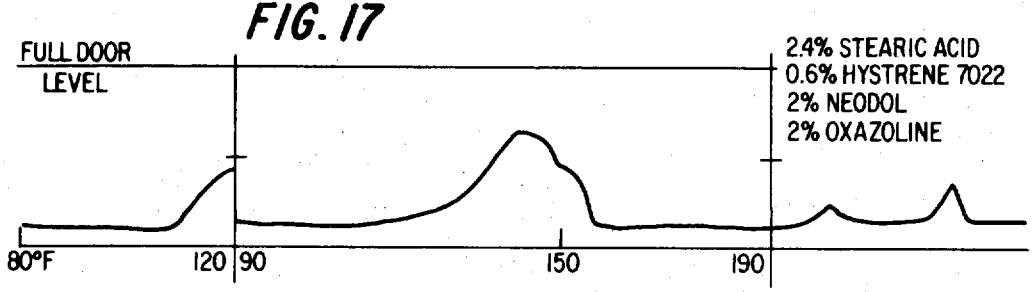
Figure 18:
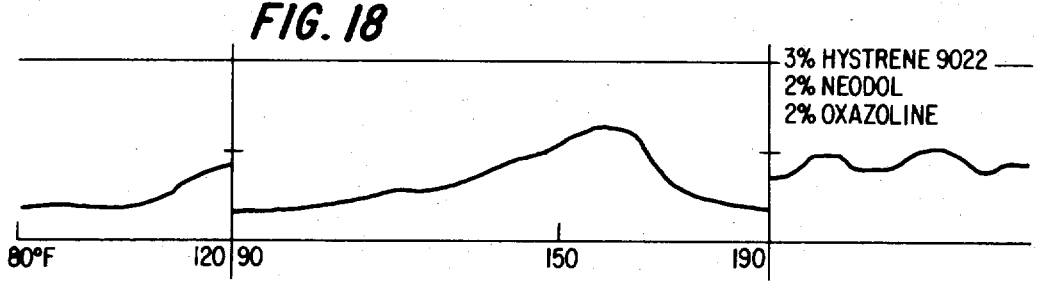
Figure 19:
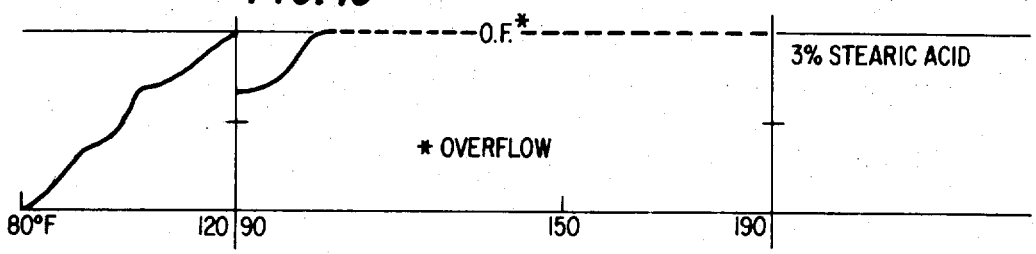
Figure 20:
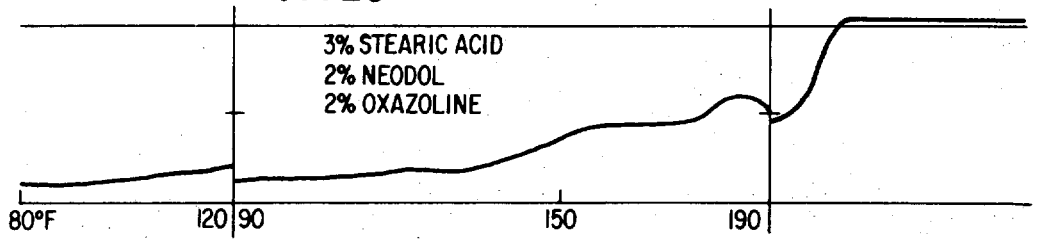

Two detergent systems were prepared according to the formula of Example 1. One of these systems had 2 percent Neodol 45-11 (polyethoxylated (11 moles) linear alcohol)[1]. The other formulation included 2 percent 2-heptadecyl - 4 - dimethyl - 2 - oxazoline. Each of these detergent systems was tested according to the procedure set forth above and each overflowed within a short time, demonstrating that both the Neodol and the oxazoline alone did not provide the necessary effect on the foam profile of the detergent system (FIGS. 3 and 4).

EXAMPLE 3

Four detergent systems were formulated having the following composition:

| | Percent | | | |
|---|---|---|---|---|
| | 1 | 2 | 3 | 4 |
| Ingredient: | | | | |
| Water | 8.5 | 8.5 | 8.5 | 8.5 |
| Sodium alkylbenzene* sulfonate | 10.0 | 10.0 | 10.0 | 10.0 |
| Sodium perborate tetrahydrate | 30.0 | 30.0 | 30.0 | 30.0 |
| Sodium tripolyphosphate | 35.0 | 35.0 | 35.0 | 35.0 |
| Sodium hydroxide | 0.4 | 0.4 | 0.4 | 0.4 |
| Sodium silicate | 7.0 | 7.0 | 7.0 | 7.0 |
| Sodium carboxymethyl cellulose | 0.5 | 0.5 | 0.5 | 0.5 |
| Polyvinyl alcohol | 0.2 | 0.2 | 0.2 | 0.2 |
| Hyfac 432 [1] | 3.0 | 3.0 | 3.0 | 3.0 |
| Neodol 45-11 | | 2.0 | | 2.0 |
| Oxyzoline [2] | | | 2.0 | 2.0 |
| Sodium sulfate* tridecyl | 5.4 | 3.4 | 3.4 | 1.4 |

[1] Hydrogenated fish fatty acid.
[2] 2-heptadecyl-4-dimethyl-2-oxazoline.
*Sodium salt.

Each of these systems was tested in the Miele washing machine according to the above-described procedure, and the foam profiles were determined. The results are shown in FIGS. 5, 6, 7, and 8, respectively. As can be readily seen, the acid alone, while it did not cause overflowing in the pre-wash cycle, did readily overflow in the wash cycle, although eventually the foam level did drop.

The combination of Hyfac and Neodol also overflowed in the wash cycle in much the same way as the Hyfac alone.

The system containing Hyfac and the oxazoline also followed the pattern of the system with Hyfac alone to some extent. The foam reached a full door level but stopped short of overflowing.

Finally, the detergent which included the ternary system of the present invention demostrated a foam profile approximating the ideal profile set forth in FIG. 1.

Thus, it is immediately clear that any one of the three ingredients of the inventive ternary system alone does not achieve the desired result, nor does a combination of two of the ingredients. The ideal foam profile is achieved only by using the synergistic combination of the fatty acid, the polyethoxylated linear alcohol, and the oxazoline.

EXAMPLES 4-13

Detergent systems were formulated as in Example 3, but substituting various acids for the Hyfac 431. Each

[1] Primarily $C_{14}$–$C_{15}$.

of these was evaluated in the same manner as the other detergent systems. The acids are set forth below:

| Acid | | Neodol, percent | Oxazoline, percent | Drawing figure |
|---|---|---|---|---|
| Example: | | | | |
| 4 | {Docosanoic, 3% | | | 9 |
| | do | 2 | 2 | 10 |
| 5 | Stearic, 2.4% and docosanoic, 0.6%. | | | 11 |
| | do | 2 | 2 | 12 |
| 6 | Docosanoic, 2.4% and lauric, 0.6%. | 2 | 2 | 13 |
| 7 | Docosanoic, 2.4% and 12-hydroxystearic, 0.3%. | 2 | 2 | 14 |
| 8 | Hystrene 7022, 3% | | | 15 |
| 9 | do | 2 | 2 | 16 |
| 10 | Stearic, 2.4% and Hystrene 7022, 0.6%. | 2 | 2 | 17 |
| 11 | Hystrene 9022, 3% | 2 | 2 | 18 |
| 12 | Stearic, 3% | | | 19 |
| 13 | do | 2 | 2 | 20 |

Referring to FIGS. 9 through 20, it will be seen that in each instance wherein an acid or a mixture of acids was used without the polyethoxylated alcohol and the oxazoline overflowing occurred. In each instance where the synergistic ternary mixture of the present invention was used, there was no overflowing and, except for the system which included stearic acid as the only acid, the foam profiles approximated the ideal. The system using stearic acid had foaming to the top of the door, but it did not overflow.

In the description and claims, reference to fatty acids or the like includes the corresponding water-soluble soaps thereof, preferably the alkali metal soaps such as sodium and potassium. In general, the fatty acids per se and soaps thereof may be used interchangeably depending upon economics, method of manufacture of the composition with other ingredients and its use in washing. For example, fatty acids may exist in the product when post-added to a detergent powder; or partly or wholly in the form of soap when added to a slurry or solution during manufacture of detergent products in the presence of alkaline materials or in alkaline washing solutions.

Thus, it can be seen that the objects set forth at the outset have been successively achieved. The present invention has been described with reference to certain embodiments thereof, which are to be considered as exemplary, the invention being limited only by the claims.

What is claimed is:

1. A composition for regulating the foam profile of a detergent system, said composition consisting essentially of from about 20 to 80% by weight of $C_8$–$C_{30}$ fatty acid, from about 10 to 60% by weight of $C_{12}$–$C_{30}$ polyethoxylated linear alcohol containing from about 10 to 50 moles of ethylene oxide and from about 10 to about 60% by weight of an oxazoline having the formula:

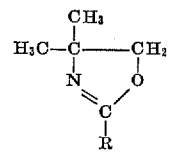

wherein R represents an alkyl group having from about 15 to about 21 carbon atoms.

2. A composition according to claim 1 wherein said fatty acid contains from about 14 to 22 carbon atoms.

3. A composition according to claim 2 wherein said fatty acid is hydrogenated fish fatty acid.

4. A composition according to claim 2 wherein said fatty acid is a mixture of $C_{20}$ to $C_{22}$ fatty acids.

5. A composition according to claim 2 wherein said fatty acid is docosanoic acid.

6. A composition according to claim 2 wherein said fatty acid is a mixture of docosanoic acid and 12-hydroxystearic acid.

7. A composition according to claim 1 wherein said fatty acid is present in from about 35 to 60 percent by weight of said composition.

8. A composition according to claim 1 wherein said alcohol is present in about 30 percent of said composition.

9. A composition according to claim 1 wherein said oxazoline is 2-heptadecyl-4-dimethyl-2-oxazoline.

10. A composition according to claim 1 wherein said alcohol is a polyethoxylated linear alcohol containing 11 moles of ethylene oxide.

11. A detergent composition having an inverse foam-to-temperature relationship consisting essentially of from 8 to 18% by weight of built anionic detergent, from about 1 to 6% by weight of $C_8$–$C_{30}$ fatty acid, from about 1 to 6% by weight of $C_{12}$–$C_{20}$ polyethoxylated linear alcohol containing from about 10 to 50 moles of ethylene oxide and from about 1 to 6% by weight of an oxazoline having the formula

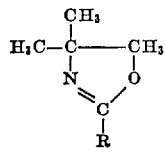

wherein R represents an alkyl group having from about 15 to about 21 carbon atoms.

12. A composition according to claim 11 wherein said anionic detergent is a linear alkyl benzene sulfonate having about 10 to 22 carbon atoms in the alkyl group.

13. A composition according to claim 12 wherein said alkyl group has about 12 to 15 carbon atoms.

14. A composition according to claim 11, which includes about 10 to 15% linear alkyl benzene sulfonate, and builder salts selected from the group consisting of alkali metal and ammonium polyphosphates, silicates, borates, sulfates, and combinations thereof.

15. A composition according to claim 11 wherein said fatty acid contains from about 14 to 22 carbon atoms.

16. A composition according to claim 15 wherein said fatty acid is hydrogenated fish fatty acid.

17. A composition according to claim 15 wherein said fatty acid is a mixture of $C_{20}$ to $C_{22}$ fatty acids.

18. A composition according to claim 15 wherein said fatty acid is docosanoic acid.

19. A composition according to claim 15 wherein said fatty acid is a mixture of docosanoic acid and 12-hydroxystearic acid.

20. A composition according to claim 11 wherein said fatty acid is present from about 2 to 5 percent by weight of said composition.

21. A composition according to claim 11 wherein said alcohol is present in about 2 percent by weight of said composition.

22. A composition according to claim 11 wherein said oxazoline is 2-heptadecyl-4-dimethyl-2-oxazoline.

23. A composition according to claim 1 wherein said detergent is a $C_8$–$C_{22}$ alkylbenzene sulfonate, a $C_8$–$C_{25}$ olefin sulfonate, a $C_{10}$–$C_{22}$ paraffin sulfonate or a $C_{10}$–$C_{20}$ linear alkyl sulfate or polyethoxylated derivative thereof containing from 1 to 100 moles of ethylene oxide.

24. A composition according to claim 23 wherein said detergent is linear tridecyl benzene sulfonate.

25. A composition according to claim 11 wherein said alcohol is a polyethoxylated linear alcohol containing 11 moles of ethylene oxide.

References Cited

UNITED STATES PATENTS

| | | | |
|---|---|---|---|
| 2,443,825 | 6/1948 | Johnson | 252—321 X |
| 2,329,619 | 9/1943 | Jayne et al. | 252—152 X |
| 2,954,347 | 9/1960 | St. John et al. | 252—358 X |
| 3,324,038 | 6/1967 | Chaffee et al. | 252—152 |

FOREIGN PATENTS

| | | |
|---|---|---|
| 800,291 | 8/1958 | Great Britain. |

OTHER REFERENCES

Matson, T. P., "Syndets with Alcohol Derivatives," Soap and Chemical Specialties, November 1963, p. 52.

RICHARD D. LOVERING, Primary Examiner

U.S. Cl. X.R.

252—99, 102, 110, 117, 121, 321, 358, 542, Dig. 6, Dig. 11, Dig. 14, Dig. 15